A. NESTOR.
BREAD CUTTER.
APPLICATION FILED OCT. 20, 1917.

1,276,398.

Patented Aug. 20, 1918.
2 SHEETS—SHEET 1.

INVENTOR.
Alexander Nestor.
BY
Chas Geier
HIS ATTORNEY

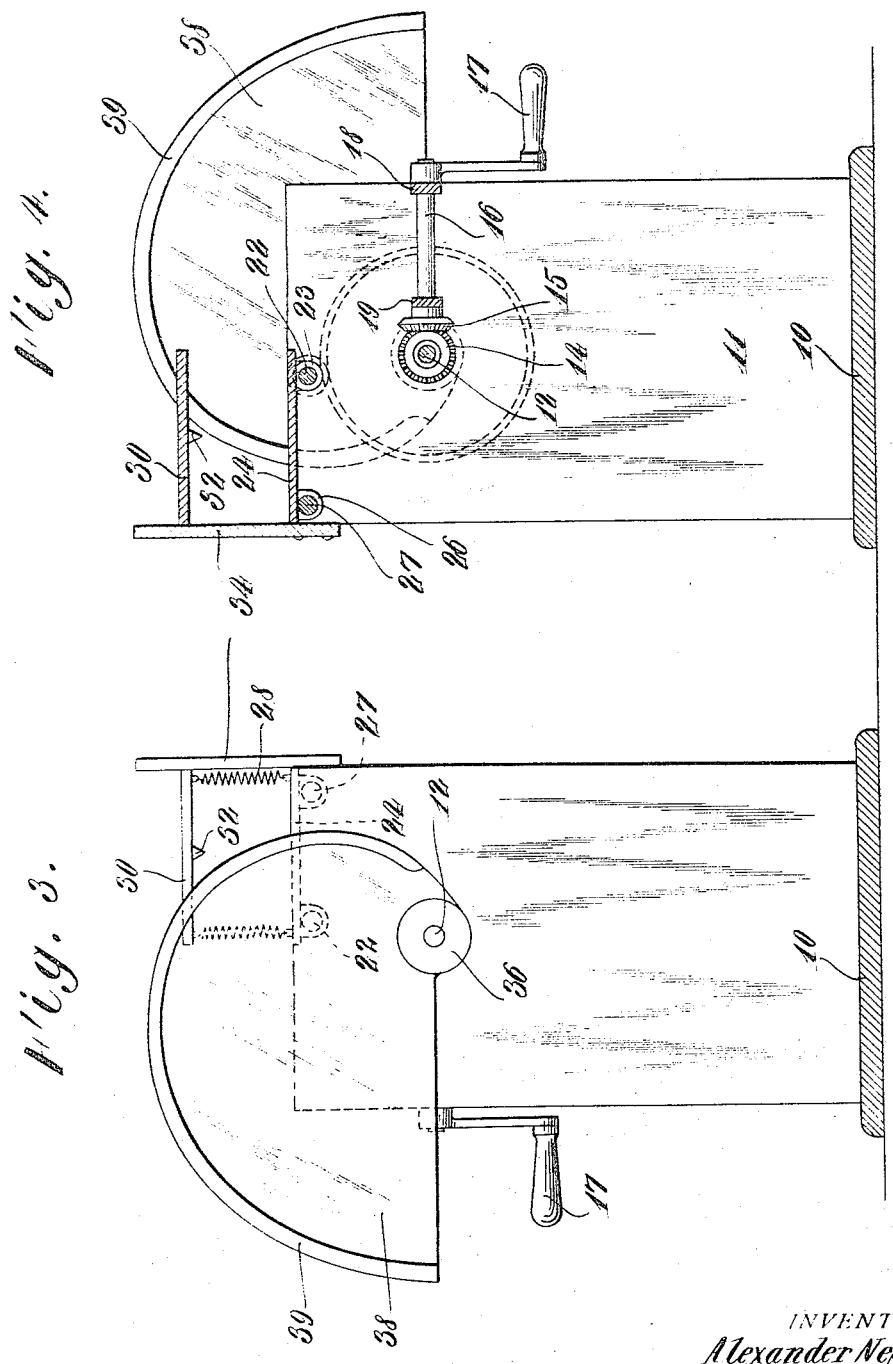

UNITED STATES PATENT OFFICE.

ALEXANDER NESTOR, OF CHICAGO, ILLINOIS.

BREAD-CUTTER.

1,276,398.   Specification of Letters Patent.   Patented Aug. 20, 1918.

Application filed October 20, 1917. Serial No. 197,524.

*To all whom it may concern:*

Be it known that I, ALEXANDER NESTOR, a citizen of Russia, resident of Chicago, county of Cook, and State of Illinois, have invented certain new and useful Improvements in Bread-Cutters, of which the following is a specification.

This invention relates to improvements in machines for slicing bread, where the same is used in large quantities, and the principal object of the invention is to provide means which engage with an ordinary loaf, so that the same is brought into operative engagement with a revoluble knife, the operation of feeding and cutting being accomplished by the movement of a single crank.

A further object is to provide means with which the bread loaf may be conveniently and readily secured in connection with the traveling element, irrespective of its shape or size within reasonable limits.

These and other like objects are attained by the novel construction and combination of parts hereafter described and shown in the accompanying drawings, forming a material part of this disclosure, and in which—

Fig. 3 is a vertical sectional view taken on line 3—3 of Fig. 1, and

Fig. 4 is a similar vertical sectional view taken on line 4—4 of Fig. 1.

Figure 1:
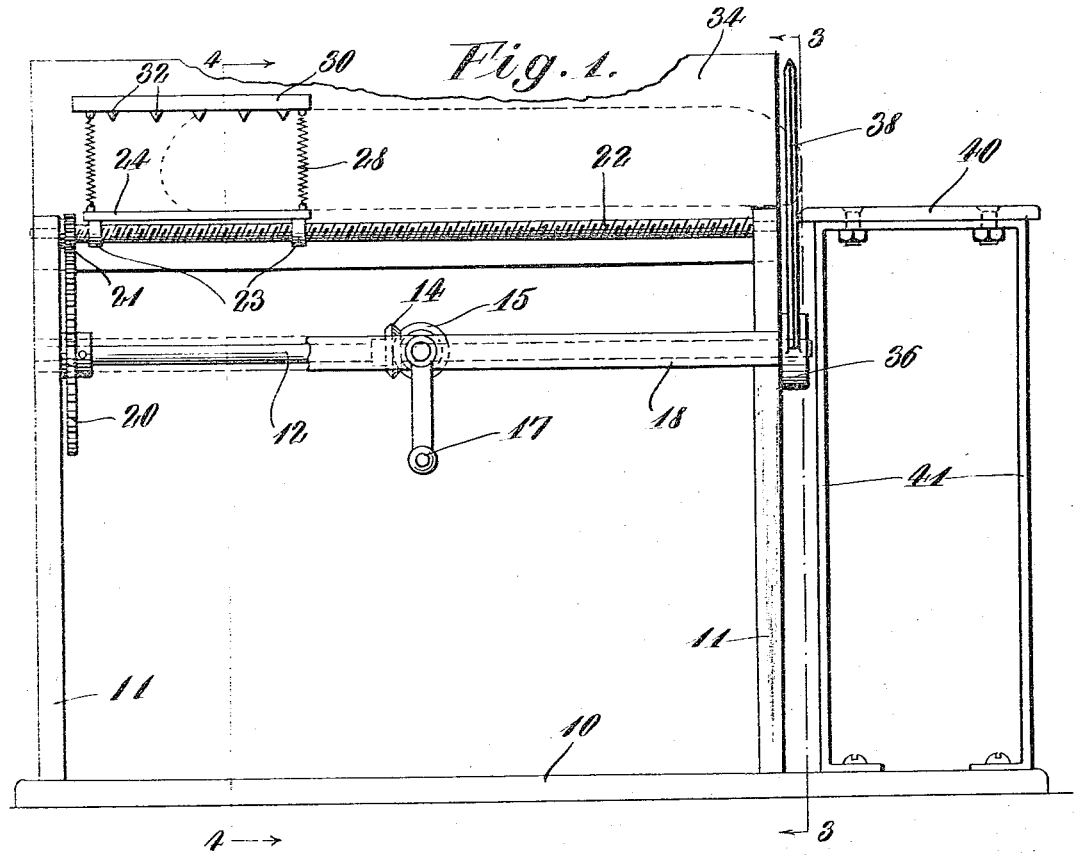
Figure 1 is a side elevational view of a machine, made in accordance with the invention, parts being broken away in order to show the construction.

The machine comprises a pedestal 10, from which arise standards 11, constituting a frame in which is journaled a shaft 12, having affixed upon it a bevel gear 14, meshing with a mating gear 15, the latter upon the end of a transverse shaft 16, actuated by an extending crank handle 17, and carried in support bars 18 and 19.

Also fixed upon the shaft 12, closely adjacent to one of the standards 11, is a spur gear 20, the same meshing with a spur pinion 21, which is attached upon the outer end of a coarse-threaded screw 22, journaled in the standards 11, near their upper ends.

Engaged with the screw 22, are internally threaded brackets 23, the same being rigidly attached to a platform 24, near one of its edges, the plate being further supported upon other brackets 26, slidably mounted upon a shaft 27, secured parallel to and in the same plane as the screw 22.

Engaged with the platform 24, at each of its four corners, are tension springs 28, their upper ends connecting with a plate 30, carrying on its lower side a plurality of spurs 32, the plate 30 being guided by a longitudinally disposed vertical plate 34, secured at its lower edge to the standards 11.

Also rigidly secured to the shaft 12 is a hub 36, of a cutter 38, having a spirally formed cutting edge 39, the same being arranged so that the inner part of the spiral is adapted to make contact with the outer surface of the loaf when the same is brought into engagement with it by rotating the handle 17, which, as will be seen, not only serves to actuate the cutter, but advances the platform on which the bread loaf is confined, the cut slices being delivered upon a plate 40, substantially level with the platform 24, and supported by the standards 41 from the pedestral 10.

Figure 2:
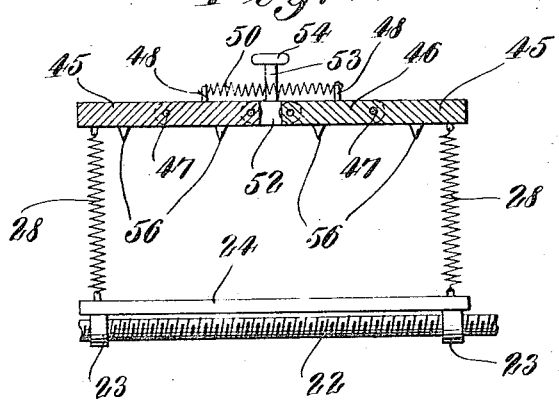
Fig. 2 is an enlarged transverse sectional view showing a preferred form of the bread engaging means.

In the modified form shown in Fig. 2, a similar contrivance is observable in which the tension springs 28, engage with the platform 24, at their lower ends and a sectional plate at their upper ends, the plate being comprised of outer elements 45, with which are hingedly engaged inner leaf elements 46 by pins 47, there being set in the upper surface of the inner elements 46 projections 48, between which is extended a tension spring 50 so as to hold them normally horizontal. Connecting the elements 46, is a central joint link 52, in which is rigidly secured a stem 53, the same extending upward and being furnished with an operating knob 54.

Spurs 56, are secured to the lower side of the elements 45 and 46, in a manner clearly indicated and which are adapted to enter and engage with the upper surface of a loaf of bread entered therebetween.

In this form of construction, by raising the knob 54, the upper sectional plate, comprised of the hinged elements will be readily raised, permitting convenient insertion of the bread loaf therebelow, and it will be noted that the construction of the upper plate is such as will permit it to conform readily to the upper surface of the loaf, which frequently is curved and irregular.

In operation, the bread loaf having been placed in the carriage upon the platform 24, and there held in position by the spurs, the crank handle 17 is actuated, causing the platform to advance in proportion according to the gearing and pitch of the screw 22, while at the same time the knife severs the loaf into slices of predetermined thickness in an easy and convenient manner.

Having thus described my invention what I claim as new and desire to secure by Letters Patent, is:—

1. In a bread cutter, the combination with a frame a platform mounted to move longitudinally thereon, means for actuating said platform, and a revoluble cutter adapted to sever a bread loaf, of a clamping means for a bread loaf, said clamping means comprising a plurality of hinged plates, spring connections between the outermost of said plates and said platform, means for holding said plate elements normally in a horizontal plane, and means for raising said elements whereby a bread loaf may be inserted thereunder.

2. In a bread cutter, a carriage comprised of a platform upon which the bread loaf is placed, a sectional clamping plate for the broad loaf, resilient connections between said sectional plate and said platform, spurs formed with said sectional plate adapted to engage with the bread loaf, means for holding said sectional plate normally horizontal, means for raising said sectional plate so that a bread loaf may be inserted thereunder, means for advancing said platform, and means for slicing the bread loaf, said slicing means and advancing means acting coincidently.

In testimony whereof I have affixed my signature.

ALEXANDER NESTOR.